United States Patent
Lippens et al.

(12) 
(10) Patent No.: US 6,457,405 B1
(45) Date of Patent: Oct. 1, 2002

(54) SENSOR ARRANGEMENT FOR AN AGRICULTURAL BALER

(75) Inventors: Christiaan A. C. Lippens, Sint-Laureins (BE); Adrianus Naaktgeboren, Varsenare (BE)

(73) Assignee: New Holland North America, Inc., New Holland, PA (US)

( * ) Notice: Subject to any disclaimer, the term of this patent is extended or adjusted under 35 U.S.C. 154(b) by 235 days.

(21) Appl. No.: 09/596,881

(22) Filed: Jun. 20, 2000

(30) Foreign Application Priority Data

Jul. 8, 1999 (GB) .............................. 9915935

(51) Int. Cl.⁷ ............................................. B30B 15/14
(52) U.S. Cl. .......................... 100/99; 100/43; 100/192
(58) Field of Search ........................... 100/191, 42, 43, 100/50, 45, 99, 189, 192; 56/341

(56) References Cited

U.S. PATENT DOCUMENTS

| | | | |
|---|---|---|---|
| 4,624,180 A | 11/1986 | Strosser | 100/41 |
| 5,123,338 A * | 6/1992 | Mathis | 100/43 |
| 5,226,356 A * | 7/1993 | Schrag et al. | 100/41 |
| 5,252,570 A * | 10/1993 | Goeckner | 100/43 |
| 6,026,741 A * | 2/2000 | Lippens et al. | 100/41 |
| 6,101,932 A * | 8/2000 | Wilkens | 100/41 |

FOREIGN PATENT DOCUMENTS

| | | | |
|---|---|---|---|
| EP | 0273067 | * | 12/1986 |
| EP | 0389322 | * | 9/1990 |
| EP | 0713637 | | 5/1996 |

* cited by examiner

Primary Examiner—Allen Ostrager
Assistant Examiner—Jimmy T. Nguyen
(74) Attorney, Agent, or Firm—John William Stader; Larry W. Miller

(57) ABSTRACT

An agricultural baler comprises a frame, a pick-up assembly for picking up crop material from a field and a baling chamber for receiving crop material from the pick-up assembly, the baling chamber having at least one movable wall portion. A plunger is mounted for reciprocating movement in the baling chamber for compression of the crop material therein, the plunger being driven by a gearbox which is affixed to the frame. A control unit adjusts the position of the movable wall portion in response to the signal from a load sensor, which is connected by a lever to the plunger gearbox for monitoring the reaction forces of the crop material on the plunger during the compression stroke. The lever arrangement includes a longitudinal pull member connected to one arm of the lever and a ball bearing mounted over the load sensor and connected to the other arm of the lever for precluding the effects of transverse or upward vibrations of the gearbox on the sensor.

7 Claims, 2 Drawing Sheets

SENSOR ARRANGEMENT FOR AN AGRICULTURAL BALER

BACKGROUND OF INVENTION

1. Field of Art

The present invention relates to agricultural balers that produce rectangular bales and more particularly to an arrangement of a sensor which is used for controlling the density of the produced bale.

2. Description of Prior Art

In an agricultural baler, material such as hay, straw, silage or similar crop material that previously has been cut, windrowed or swathed, is picked up from the field by a pick-up unit, fed into a duct and loaded into an elongated bale chamber. A plunger which reciprocates in the front portion of the baling chamber compresses the newly introduced material against the previously introduced material into a parallelepiped package, and at the same time, gradually advances the package towards the outlet of the bale chamber. As the package reaches a predetermined length as determined by a metering device, a knotter device is actuated to wrap cord, twine or other flexible binding material around the package and to secure the ends of the binding material together to form a stable bale.

Commonly the baling chamber has at least one movable wall portion whereof the position can be changed to vary the outlet section of the baling chamber. An enlarged outlet section reduces the forces needed to advance the bales in the baler and hence diminishes the density of the newly formed bales. Otherwise, a reduced section substantially increases the friction forces of the bale along the chamber and thereby raises the compression forces exerted by the plunger on the crop material. Accordingly, the density of the new bales will increase.

It is known in the art to adjust the position of the movable wall in accordance with a signal of a load sensor in order to produce bales having a predetermined density. Typically, the position of the rear portion of the baling chamber is controlled by a hydraulic cylinder in response to a sensor monitoring the forces exerted by the plunger. U.S. Pat. No. 4,624,180 shows a baler having a plunger which is connected by a pair of wrist pins to a pair of connecting rods, which in turn are linked to a pair of rotating cranks on a gearbox. The wrist pins are equipped with strain gauges for monitoring the forces applied by the plunger. As the full compression force on the plunger is transferred upon the wrist pins, they have to be of a sturdy design. However, some deformation must be allowed to make the sensor finish discernable signals that can be used in adjusting the outlet area of the baling chamber.

Other sensor embodiments are illustrated in U.S. Pat. No. 5,123,338. According to one embodiment, a substantially mechanical sensor reacts to the forces applied by the plunger on the connecting rod. The result. is a mere ON-OFF signal which provides no intermediate data on the actual plunger load. Such output cannot be used for a refined adjustment of the bale density. The compression level achieved by this control system has to be adjusted by mechanical means on the baler itself.

Another embodiment in the same document shows a load sensor arranged between the gearbox driving the plunger and the main frame of the baler. The reaction forces of the plunger on the gearbox are measured by strain gauges affixed to an arm that is interconnecting the top of the gearbox and the frame. The output signal is variable such that it can be used for setting a wide range of densities. However, upon failure of any of the gauges, the complete assembly of arm and gauges has to be replaced, which is expensive and cumbersome.

Accordingly, there is a need for a sensor arrangement which enables easy replacement of the sensor element and which no longer requires very sturdy and relatively insensitive sensors.

SUMMARY OF THE INVENTION

According to the invention, there is provided an agricultural baler having a frame, a pick-up assembly for picking up crop material from a field and a baling chamber for receiving crop material from said pick-up assembly, said baling chamber having at least one movable wall portion. There is a plunger mounted for reciprocating movement in said baling chamber for compression of the crop material therein. The plunger being driven by a gearbox affixed to said frame. There is a control unit for adjusting the position of the movable wall portion in response to the signal from a load sensor. The load sensor senses at least a portion of the reaction forces of the crop material on the plunger during the compression stroke. The load sensor is mounted to the lever for measurement of a portion of said reaction forces.

The lever arrangement reduces the forces on the load sensor and hence enables the use of lighter and more sensitive load sensors. The lever may have its fulcrum connected to the gearbox and the arrangement may include a substantially longitudinal member connecting one arm of the lever to the frame, while the other arm is connected to the load sensor. The sensor may be connected to the frame via a linkage allowing upward movement of the gearbox. In this manner, vertical vibrations of the gearbox as caused during baling operations will have no effect on the sensor readings. To preclude the effects from sideways distortion of the gearbox or of the frame, the load sensor may be mounted to a linkage including spherical bearing means, such as a ball bearing or an assembly of a concave and a convex washer.

The load sensor preferably has a cylindrical body that is inserted transversely through the lever and the ball bearing, such that it can be replaced easily.

Advantageously, the sensor comprises a Hall effect sensor for good precision and reliable operation.

BRIEF DESCRIPTION OF THE DRAWINGS

A load sensor arrangement in accordance with the present invention will now be described in further detail with reference to the accompanying drawings.

DETAILED DESCRIPTION OF THE PREFERRED EMBODIMENT

The terms "front", "rear", "forward", "rearward", "left" and "right" used throughout this description are determined with respect to the normal direction of travel of the machine in operation. However, they are not to be construed as limiting terms.

Figure 1:
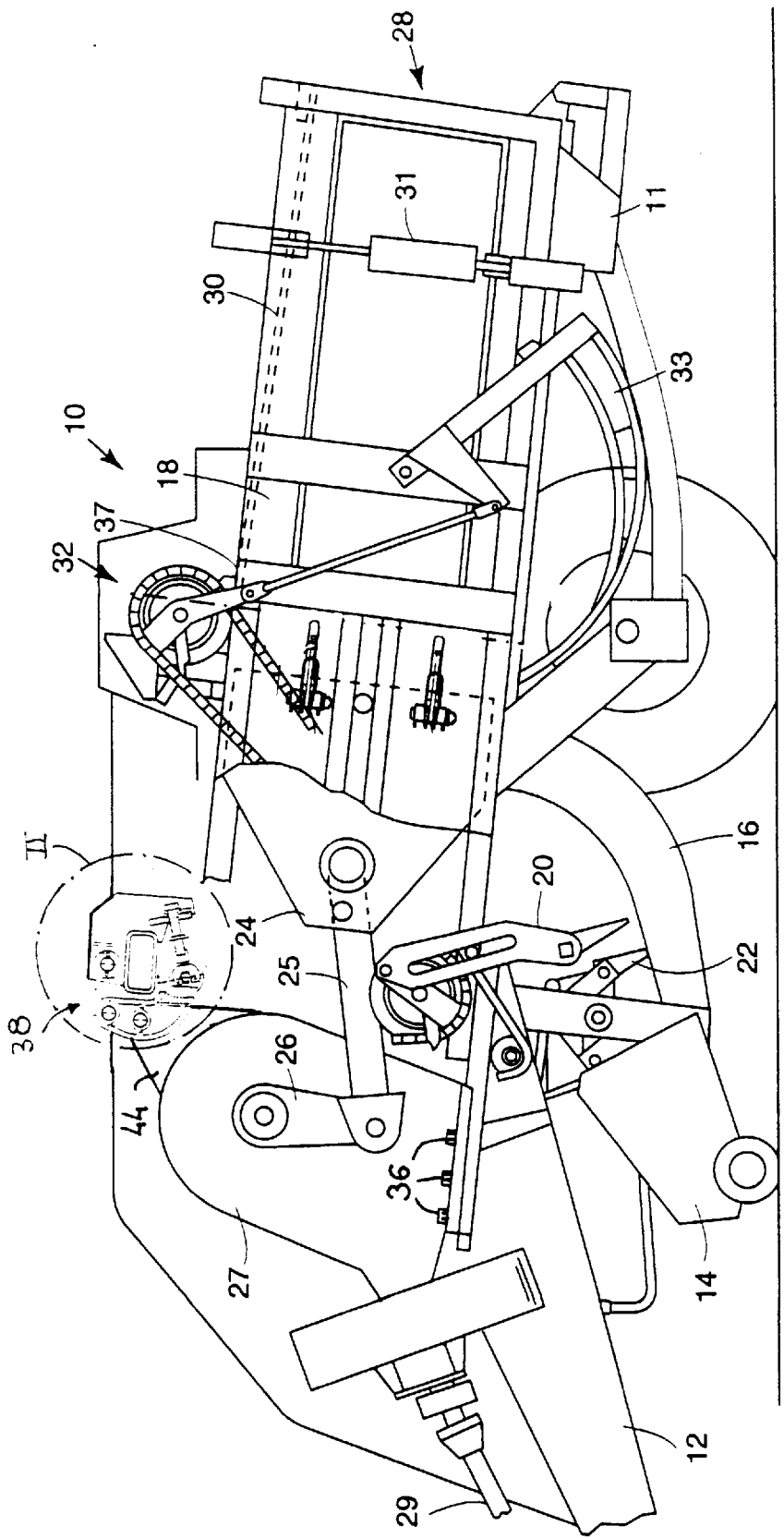
FIG. 1 is a diagrammatical, partly sectional side view of a rectangular baler.

FIG. 1 shows an agricultural baler 10 comprising a main frame 11 which is equipped with a forwardly extending tongue 12 provided at its front end with hitch means (not shown) for coupling the baler 10 to a towing tractor. A pick-up assembly 14 lifts windrowed crop material off the field as the baler 10 is traveled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means (not shown) for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 under action of a pair of connecting or pitman rods 25 which are linked to the crank arms 26 of a gearbox 27 driven by a transmission shaft 29 which is connected to the PTO shaft of the tractor. The reciprocating plunger 24 pushes each new charge introduced into the baling chamber 18 rearwardly and forms the subsequent charges into a parallelepiped package of crop material, which is forced by the same action of the plunger 24 toward a rearmost discharge aperture 28 of the chamber.

The baling chamber 18 comprises at least one movable wall portion 30 of which the position can be adjusted to vary the cross section of the aperture 28. Reduction of this cross section will increase the resistance to rearward movement of the crop packages and hence increase the density of the crop material contained therein. Similarly an enlargement of the cross section will reduce said resistance to rearward movement and hence equally reduce the density of the newly formed packages. The position of the wall portion 30 is controlled by actuator means comprising of a pair of hydraulic cylinders 31 (only one shown in FIG. 1) which are installed between the frame 11 and the wall portion 30.

Before leaving the confines of the baler 10, each package is securely bound in its final compacted form by a tying mechanism 32. The length of each bale produced by the baler 10 can be adjustably predetermined by conventional means not shown. The tying mechanism 32 comprises a series of periodically actuated needles 33 which are normally stationed in a stand-by condition below the chamber 18 but which, when actuated, swing upwardly through and across the baling chamber 18 to present twine to a corresponding series of knotters positioned on top of the chamber 18 and extending across the width of the latter.

Figure 2:
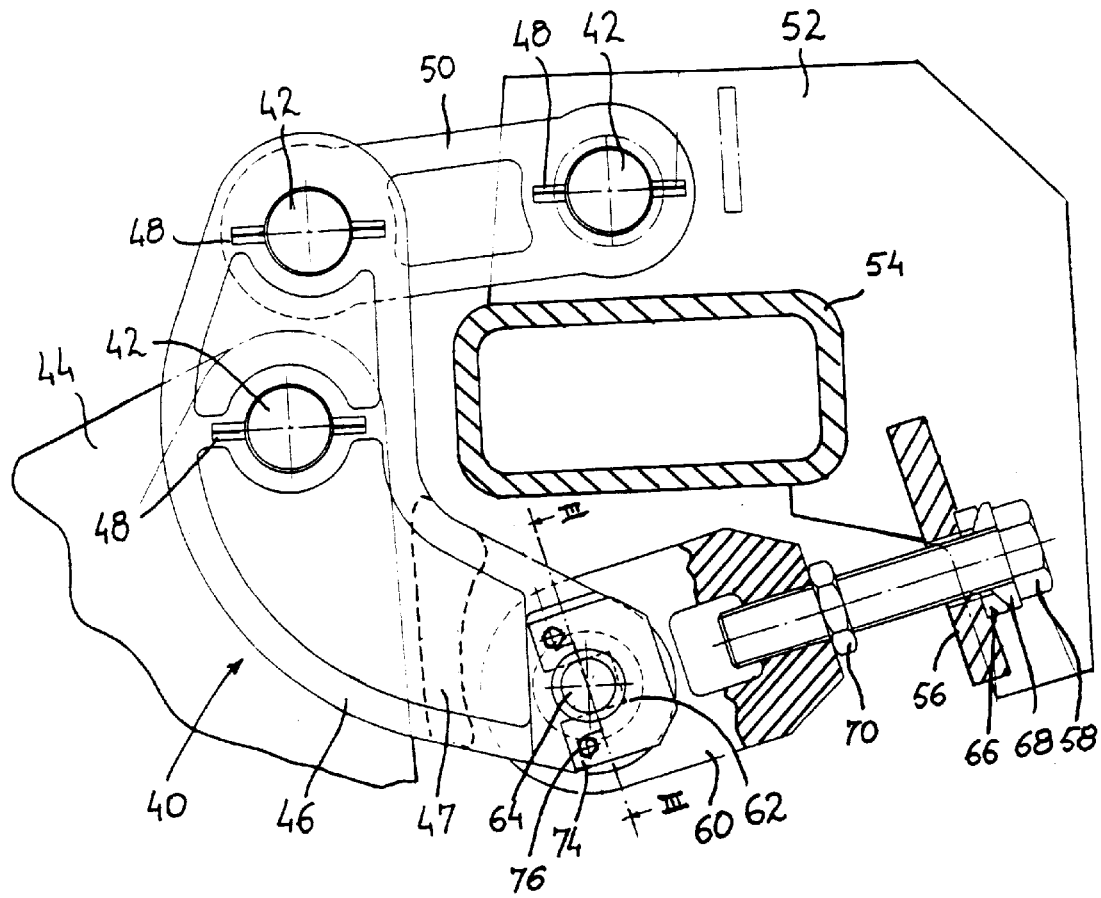
FIG. 2 is an enlarged side view of detail II of FIG. 1.
Figure 3:
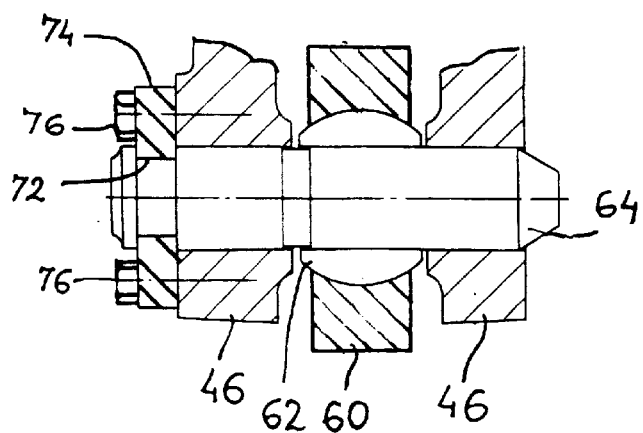
FIG. 3 is cross sectional view taken along lines III—III in FIG. 2.

The gearbox 27 is affixed at its lower section by a set of bolts 36 to the main frame 11. The top portion of the gearbox is held in place by a linkage and sensor assembly, generally designated by numeral 38 and shown in further detail in FIG. 2. The linkage is designed to withstand the reaction forces of the plunger 24 on the body of the gearbox 27. It comprises a lever 40 that is mounted by a transverse cylindrical pin 42 to a flat protrusion 44 on the upper housing portion of the gearbox 27. The lever 40 may be cast or forged and comprises two symmetrical, generally L-shaped members 46 which extend on both sides of the protrusion 44, and an intermediate member 47 interconnecting the side members 46. The pin 42 extends through holes in the members 46 and the gearbox protrusion 44 and is kept in place by a pair of spring pins 48 inserted through holes at both ends of the transverse pin 42. The axis of the pin 42 constitutes the fulcrum of the lever 40.

The linkage assembly 38 further comprises a pull member 50 having a front end that is pivotally connected by a second pin 42 to the upper arm of the lever 40. The rear end of the pull member 50 is mounted by a third pin 42 between a pair of upright support plates 52 that are welded to a transverse beam 54 of the main frame 11. In addition, the second and third pins 42 are secured in place by pairs of spring pins 48.

The support plates 52 have portions extending over and below the beam 54 and between which a transverse bracket plate 56 is welded. This plate is facing the lower end of the lever 40. A draw bolt 58 extends through a hole in the plate 56 and into the rear portion of a bearing block 60. At its front end the block 60 holds a spherical bearing 62, such as a ball joint, which is mounted between the lower ends of the lever members 46. A load sensor 64, having a cylindrical body, is inserted through holes in these lower ends and through the bearing 62. The sensor is operable to sense the force exerted by the lever 40 on the bracket plate 56. Preferably, the sensor senses the force in a substantially longitudinal direction. In order to preclude the occurrence of transverse stress upon the bearing block 60, the head of the draw bolt 58 is not pulled directly against the bracket plate 56, but against an intermediate spherical bearing means, including a concave washer 66 resting against the plate 56 and a convex washer 68 resting in the concave portion of the washer 66. The draw bolt 58 is screwed into the bearing block 60 and adjusted to eliminate the play between the linkage assembly 38 and the frame 11, and is secured by a lock nut 70.

The sensor 64 may comprise a conventional Hall effect sensor well known in the art or a Hall effect sensor of the type described in European Patent Application 0 713 637, page 4, lines 37–51, incorporated herein by reference. As these sensors are sensitive to the orientation of the sensor body, the latter has a square waist 72 over which is a fork plate 74 is slid. The fork plate and hence the sensor 64 are positioned by a pair of screws 76 inserted through the plate 74 in the side of one of the lever members 46.

During each compression stroke of the plunger 24, the reaction forces of the crop material upon the plunger face are transmitted by the pitman rod 25 and the crank arm 26 upon the gearbox 27. Part of these forces is assumed by the bolt attachment 36 of the lower part of the gearbox 27 to the main frame 11. The remainder of the reaction forces are assumed by the linkage assembly 38 at the top of the gearbox. This part of the load is not assumed by the load sensor 64 alone, as the lever 46 divides the load over the connection to this sensor and the connection to the pull member 50. By providing a short load arm between the fulcrum and the upper pin 42 and a longer load arm between the fulcrum and the load sensor 64, it is possible to reduce the loads on the sensor to the extent that lighter and less expensive sensors can be used. Accordingly, heavy sensors having a reduced sensitivity can be disposed of.

The output signal of the load sensor 64 is used for controlling the extension of the hydraulic cylinders 31 and thereby the position of the movable wall portion 30 of the baling chamber 18. The circuitry linked to- the cylinders comprises a hydraulic pump, drawing oil from a tank and an electrically controlled valve (not shown), as described in U.S. Pat. No. 5,123,338. The actuator of the valve is controlled by an electronic control unit that opens and closes the valve in response to the load signal provided by the sensor 64. The control unit actuates the valve to provide pressurized fluid to the cylinders 31 as long as the load signal remains below a preset threshold value, and to drain the cylinders when the signal exceeds this threshold value. In this manner, the area of the aperture 28 of the baling chamber 18 can be adapted to equalize the compression of the newly introduced crop material and to make bales of even density.

It will be appreciated that the invention is equally applicable to other mountings for the load sensor. For example, it is envisioned to provide the plunger 24 with a lever means bridging a pair of protrusions at the front end of the plunger. The lever has its ends connected to the protrusions and receives in the intermediate portion the bearing for the rear end of the pitman rod 25. The plunger 24 hence is driven via these lever means. The reaction forces from the plunger on the pitman rod are distributed over the protrusions. A load sensor is provided at the interconnection of a lever end and one of the protrusions for measurement of a portion of these reaction forces.

It will be obvious to those skilled in the art that various changes may be made without departing from the scope of the invention and the invention is not to be considered limited to what is illustrated in the drawings and described in the specification.

What is claimed is:

1. An agricultural baler comprising:

a frame;

a pick-up assembly for picking up crop material from a field;

a baling chamber for receiving crop material from said pick-up assembly, said baling chamber having at least one movable wall portion;

a plunger mounted for reciprocating movement in said baling chamber for compression of the crop material therein, said plunger being driven by a gearbox affixed to said frame; and a control unit for adjusting the position of said movable wall portion in response to a signal from a load sensor, sensing at least a portion of the reaction forces of the crop material on said plunger during a compression stroke thereof, wherein said load sensor is mounted to a lever for measurement of said portion of said reaction forces, wherein said lever is pivotably mounted to said gearbox and said lever has a first lever arm connected to a portion of said frame and a second lever arm connected to said load sensor, said sensor also connected to said main frame.

2. The agricultural baler according to claim 1 wherein said lever comprises a substantially longitudinally arranged member which has a first end pivotally mounted to said first arm of said lever and a second end pivotally mounted to said frame portion.

3. The agricultural baler according to claim 4, wherein said linkage assembly includes an adjustable member for eliminating a play of said lever and said linkage assembly.

4. The agricultural baler according to claim 3, wherein said second arm is connected to said frame by a linkage assembly including said load sensor and a spherical bearing.

5. The agricultural baler according to claim 4, wherein said linkage assembly includes an adjustable member for eliminating a play of said lever and said linkage assembly.

6. The agricultural baler according to claim 5, wherein said adjustable member comprises a draw bolt and said spherical bearing comprises a convex washer resting in a concave washer held against said frame, both said washers being arranged over said draw bolt.

7. The agricultural baler according to claim 6, wherein said load sensor comprises a Hall effect sensor.

* * * * *